(12) United States Patent
Chandra et al.

(10) Patent No.: US 7,991,512 B2
(45) Date of Patent: Aug. 2, 2011

(54) HYBRID ROBUST PREDICTIVE OPTIMIZATION METHOD OF POWER SYSTEM DISPATCH

(75) Inventors: Ramu Sharat Chandra, Niskayuna, NY (US); Yan Liu, Ballston Lake, NY (US); Sumit Bose, Niskayuna, NY (US); Juan Manuel de Bedout, West Glenville, NY (US)

(73) Assignee: General Electric Company, Niskayuna, NY (US)

( * ) Notice: Subject to any disclaimer, the term of this patent is extended or adjusted under 35 U.S.C. 154(b) by 335 days.

(21) Appl. No.: 11/897,207

(22) Filed: Aug. 28, 2007

(65) Prior Publication Data

US 2009/0062969 A1 Mar. 5, 2009

(51) Int. Cl.
*H02J 3/14* (2006.01)
(52) U.S. Cl. .................. 700/291; 700/295; 700/297
(58) Field of Classification Search .............. 700/291
See application file for complete search history.

(56) References Cited

U.S. PATENT DOCUMENTS

| | | | | |
|---|---|---|---|---|
| 7,085,660 | B2* | 8/2006 | Mansingh et al. | 702/60 |
| 7,343,360 | B1* | 3/2008 | Ristanovic et al. | 705/412 |
| 7,444,189 | B1* | 10/2008 | Marhoefer | 700/26 |
| 2006/0247990 | A1* | 11/2006 | Narayanan et al. | 705/35 |
| 2007/0100503 | A1* | 5/2007 | Balan et al. | 700/286 |
| 2007/0124026 | A1* | 5/2007 | Troxell et al. | 700/291 |
| 2007/0276547 | A1* | 11/2007 | Miller | 700/295 |

FOREIGN PATENT DOCUMENTS

WO WO 2006/132760 A2 12/2006

OTHER PUBLICATIONS

Kuek, J.D., Staunton, R.H., Labinov, S.D., Kirby, B.J. "Microgrid Energy Management System". ORNL/TM-2002/242 (Jan. 2003): 1-78.*
Lasseter, R. et al. "Integration of Distributed Energy Resources: The CERTS Microgrid Concept". LBNL-50829 (Apr. 2002): 1-27.*
Celli, G., Pilo, F., Pisano, G., Soma, G.G. "Optimal Participation of a Microgrid to the Energy Market with an Intelligent EMS". The 7th International Power Engineering Conference (2005): 1-6.*
Real-Time Power Flow in Automatic Generation Control, Bacher et al., IEEE Transactions on Power Systems, vol. 3, No. 4, pp. 1518-1529, Nov. 1988.
Stochastic multiobjective generation dispatch of combined heat and power systems, C. S. Chang, IEE Proc.—Gener. Transm, Distrib., vol. 145, No. 5, pp. 583-591, Sep. 1998.
A Review of Recent Advances in Economic Dispatch, B. H. Chowdhury et al., IEEE Transactions of Power Systems, vol. 5, No. 4, pp. 1248-1259, Nov. 1990.

(Continued)

*Primary Examiner* — Ryan A Jarrett
(74) *Attorney, Agent, or Firm* — Ann M. Agosti (57) ABSTRACT

A method of power system dispatch control solves power system dispatch problems by integrating a larger variety of generation, load and storage assets, including without limitation, combined heat and power (CHP) units, renewable generation with forecasting, controllable loads, electric, thermal and water energy storage. The method employs a predictive algorithm to dynamically schedule different assets in order to achieve global optimization and maintain the system normal operation.

20 Claims, 3 Drawing Sheets

OTHER PUBLICATIONS

A Test System for Combined Heat and Power Economic Dispatch Problems, Algie et al., 2004 IEEE International Conference on Electric Utility Deregulation, Restructuring and Power Technologies (DRPT2004), pp. 96-101, Apr. 2004, Hong Kong.

Optimization Methods for Electric Power Systems: An Overview, R.C. Bansal, International Journal of Emerging Electric Power Systems, vol. 2, Issue 1, article 1021, 2005.

Assessment of μGrid Distributed Energy Resource Potential Using DER-CAM and GIS, Jennifer L. Edwards et al., Ernest Orlando Lawrence Berkeley National Laboratory and Renewable and Appropriate Energy Laboratory, University of California, Berkeley, Jan. 2002.

Distributed Energy Resources Customer Adoption Modeling With Combined Heat and Power Applications, Consultant Report, Consortium for Electric Reliability Technology Solutions, Feb. 2004.

Development, Demonstration, and Field Testing of Enterprise-Wide Distributed Generation Energy Management System, Phase 1 Report, NREL/SR-560-33581, Apr. 2003.

Energy Manager Design for Microgrids, Pier Final Project Report, Consortium for Electric Reliability Technology Solutions, CEC-500-2005-051, Jul. 2005.

* cited by examiner

HYBRID ROBUST PREDICTIVE OPTIMIZATION METHOD OF POWER SYSTEM DISPATCH

STATEMENT REGARDING FEDERALLY SPONSORED RESEARCH & DEVELOPMENT

This invention was made with U.S. Government support under contract number DE-FC02-05CH11349 awarded by the Department of Energy. The Government has certain rights in the invention.

BACKGROUND

The invention relates generally to microgrids and more particularly to a predictive control strategy for management and control of microgrids having arbitrary numbers of assets and arbitrary system topologies.

A microgrid is defined generally as an aggregation of controllable and uncontrollable asserts which may comprise, for example, electrical generators, loads, and storage devices. Electrical generators in a microgrid typically include, for example, non-conventional energy sources such as micro turbines, wind turbines, photovoltaic systems, fuel cells, or hydrogen fed reciprocating engines. Microgrids may supply power, for example, to shopping centers, industrial parks, college campuses or villages.

Economic Dispatch is the process of allocating the required load demand between the available conventional generation units to minimize the cost of operation, primarily fuel cost. Many conventional algorithmic approaches have been proposed to implement Economic Dispatch. These include, for example: Merit Order Loading, Range Elimination, Binary Section, Secant Section, Graphical/Table Look-Up, Convex Simplex, Dantzig-Wolf Decomposition, Separable Convex Linear Programming, Reduced Gradient with Linear Constraints, Steepest Descent Gradient, First Order Gradient, Merit Order Reduced Gradient, etc. These algorithms are well documented in the literature.

The conventional electric power system representation for Economic Dispatch consists of models for the generating units. The generation model represents the cost of producing electricity as a function of power generated and the generation capability of each unit.

$$\text{Conventional unit cost function: } \min \Sigma F_i(P_i) \quad (1)$$

wherein Fi=production cost, Pi=production power
Unit capacity limits:

$$P_{i,\min} \le P_i \le P_{i,\max} \quad (2)$$

System constraints (demand–supply balance)

$$\Sigma P_i = \Sigma D_i \quad (3)$$

The conventional unit cost function does not include fuel cost, operational cost, unit degradation, and penalties such as emission, among other things.

It would be both advantageous and beneficial to provide an advanced dispatch control method that solves power system dispatch problems by integrating a larger variety of generation, load and storage assets, including, but not limited to, combined heat and power (CHP) units, renewable generation with forecasting, controllable loads, electric, thermal and water energy storage. It would be further advantageous if the advance dispatch control method were capable of dynamically scheduling the different assets in order to achieve global optimization and maintain the system normal operation.

BRIEF DESCRIPTION

Briefly, in accordance with one embodiment, a system for controlling a microgrid is provided. The system comprises:
a plurality of microgrid assets, at least one of the microgrid assets comprising a different type of asset than another one of the microgrid assets; and
a dispatch controller coupled to the plurality of microgrid assets and configured for providing control signals to adjust operation of respective microgrid assets in response to a predictive optimization control algorithm, such that heat and power generated and consumed together or independently by the plurality of microgrid assets interconnected on electric and/or thermal grids of any specified topology, are scheduled to optimize the solution of an objective function associated with microgrid operation over a predetermined time horizon based on predicted future microgrid asset conditions.

According to another embodiment, a method of controlling a microgrid comprises:
monitoring a plurality of microgrid assets; and
dispatching respective microgrid assets in response to a predictive optimization control algorithm, such that heat and power generated or consumed together or independently by the plurality of microgrid assets interconnected on electric and/or thermal grids of any specified topology, are scheduled to optimize the solution of an objective function associated with microgrid operation over a predetermined time horizon based on predicted future microgrid asset conditions.

According to yet another embodiment, a system for controlling a microgrid comprises:
a plurality of microgrid assets, at least one of the microgrid assets comprising a different type of asset than another one of the microgrid assets; and
means for adjusting operation of respective microgrid assets such that heat and power generated or consumed together or independently by the plurality of microgrid assets interconnected on electric and/or thermal grids of any specified topology, are scheduled to optimize the solution of an objective function associated with microgrid operation over a predetermined time horizon based on predicted future microgrid asset conditions.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
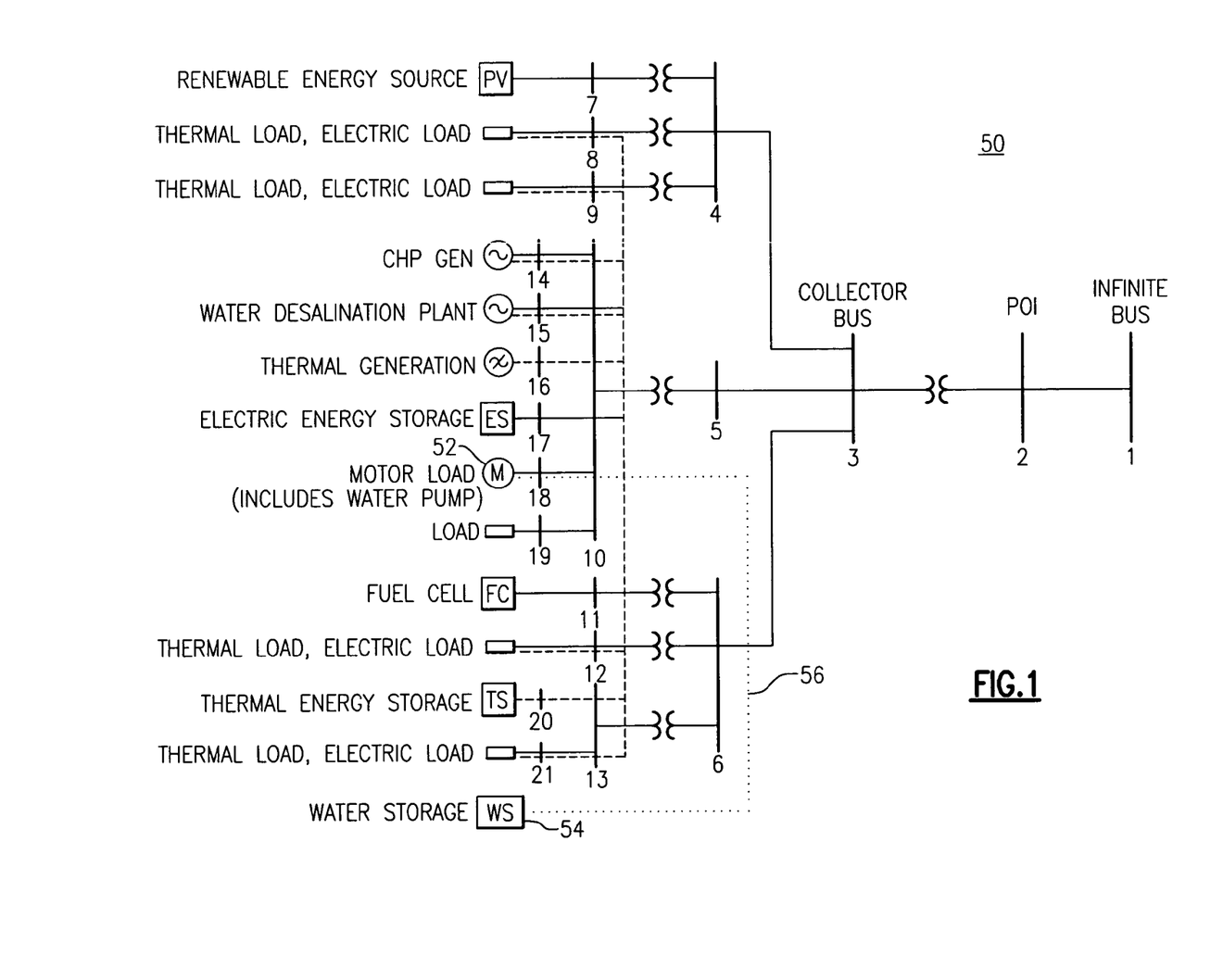
FIG. 1 is a diagrammatic representation of a class or example of a microgrid, according to one embodiment.

FIG. 1 is a diagrammatic representation of a microgrid 50 that is useful to describe a predictive approach for an optimal dispatch problem involving both heat and electric power, according to one embodiment. In this diagram, electric and thermal loads (e.g. buildings) are connected to buses 8, 9, 12 and 21 of the electric grid 50. The thermal loads can be supplied either by the combined heat and power units (CHPs), such as shown on bus 14 of the electrical grid 50, or they may be supplied, for example, by boilers (not shown in the diagram). In practice, the electrical and thermal loads, as well as the electric power generation are variable. If the predicted values of these quantities are known ahead of time, it is possible to incorporate them into an optimization strategy which minimizes the total, predicted cost of operation (over a time horizon of a predetermined number of hours, known as the prediction horizon). This predicted cost includes fuel costs (for running the CHPs or boilers in this example) and the cost of buying power from the grid 50, as well as the profit from selling power to the grid 50 (if this is an option). The optimal solution is recomputed periodically (every 15 minutes, for example, which is the time step of the algorithm) in order to take advantage of updates of the predicted loads and prices.

The detailed embodiments described herein use the following notation:

$t_0$=Time step at which the predictive optimal control problem is being solved (current time)

N=number of prediction steps. Thus, the prediction horizon is $\{t \in Z: t_0 \leq t \leq t_0 + N\}$ Only active power is considered herein, although the present invention is not so limited; therefore all electrical generation and loads are real. By convention, generation is positive and loads are negative; export to the grid at the infinite bus 1 is negative and import from the grid at the infinite bus 1 is positive. Line losses are neglected for the purposes of optimization; however, a full power flow can be run after the optimization to find the true loss associated with a particular generation profile. Individual components and assets that can be handled by the optimal dispatch solution, according to one embodiment, include:

Load bus, electrical generation bus, thermal bus and Reference bus for both electric and thermal. The network is assumed to be a tree (both the thermal network and the electrical network). Thus each electrical load and generation bus has a unique parent (upstream node). The reference bus (shown as the infinite bus 1 in FIG. 1) has no upstream node. Similarly, each thermal bus, except for one, which is designated, the thermal reference bus, has a unique parent. The electrical reference bus can both supple and receive power from the microgrid 50; the thermal reference bus can act as a heat sink but not as a source. The constraints on voltages of each bus are specified and the maximum power that can be imported/exported to the grid at the infinite bus 1 from the reference bus. Let the power exchanged with the grid be denoted by $e_g(t)$.

$N_e$ is the number of electrical generators, each on a electrical generation bus. These generators may either be dispatchable or not, which is indicated by a flag in the model. Assume that the electrical generators are indexed by $i_e \in N_e := \{1, \ldots N_e\}$). Let the subset of indices which correspond to dispatchable generators be $N_{e,d}$ and let the subset of indices which correspond to non-dispatchable generators be $N_{e,n}$. One specifies the index of the electrical generation bus to which each generator is connected, as well as other constraints (minimum and maximum active and reactive power generated, maximum allowable ramp-up and ramp-down rates of power; minimum up-time and down time).

$N_c$ is the number of combined heat and power (CHP) generators, each on a electrical generation bus. These generators may either be dispatchable or not, which is indicated by a flag in the model. Assume that the CHP generators are indexed by $i_c \in N_c \{:=1, \ldots, N_c\}$. Let the subset of indices which correspond to dispatchable CHP generators be $N_{c,d}$ and let the subset of indices which correspond to non-dispatchable generators be $N_{c,n}$. One specifies the index of the electrical generation bus to which each generator is connected, as well as other constraints (minimum and maximum active and reactive power generated, maximum allowable ramp-up and ramp-down rates of power; minimum up-time and down time), and the relation between the electricity and heat generation.

$N_t$ is the number of pure heat generation units, each on a thermal bus. These generators may either be dispatchable or not, which is indicated by a flag in the model. Assume that the pure heat generators are indexed by $i_t \in N_t := \{1, \ldots, N_t\}$. Let the subset of indices which correspond to dispatchable heat generators be $N_{t,d}$ and let the subset of indices which correspond to non-dispatchable heat generators be $N_{t,n}$. One specifies the index of the thermal bus to which each heat generator is connected, as well as other constraints (minimum and maximum heat generated, maximum allowable ramp-up and ramp-down rates of power; minimum up-time and down-time).

$N_{el}$ is the number of electrical loads, indexed by $i_{el} \in N_{el}$: $\{1, \ldots, N_{el}\}$, each connected to a electrical load bus. Specify the load demand as a function of time over the prediction horizon; this load may or may not be met due to load shedding. A priority flag can be set for some or all of the loads, which denote that load shedding, is not allowed for those loads. Let the subset of load indices for which load shedding is possible be $N_{ls}$ and the set of the rest of the indices be $N_{nls}$.

$N_{pel}$ is the number of electrical generators which have to be modeled as negative electrical loads, indexed by $i_{pel} \in N_{pel} := \{1, \ldots, N_{pel}\}$, each connected to a electrical load bus. Specify the load generation as a function of time over the prediction horizon.

$N_{tl}$ the number of thermal loads, indexed by $i_{tl} \in N_{tl} := \{1, \ldots, N_{tl}\}$. Specify the load demand as a function of time over the prediction horizon.

$N_{es}$ is the number of electrical storage units, indexed by $i_{es} \in N_{es} := \{1, \ldots, N_{es}\}$. Each unit has a charging efficiency $\eta_1$ and a discharging efficiency $\eta_2$. Specify the max ramp up and ramp down rates of stored energy and the min and max stored energy $N_{ts}$ is the number of thermal storage units, indexed by $i_{ts} \in N_{ed} := \{1, \ldots, N_{ts}\}$. Each unit has a charging efficiency $\eta_1$ and a discharging efficiency $\eta_2$. Specify the max ramp up and ramp down rates of stored energy, the min and max stored energy and a flag to indicate whether the unit acts as a sink only or whether it can be both a source and a sink of heat. Also specify the heat transfer parameters, viz., the thermal resistance, heat capacity and the ambient temperature as a function of time over the prediction horizon.

The objective function data required to optimize the solution of an objective function associated with a particular dispatch profile, according to one embodiment, includes the following:

Predicted fuel costs over the prediction horizon, $C_f(t)$

Fuel consumption curves of the various generators. These can be arbitrary functions of both the power and heat generated by the units. Let $f_E: R^{Ne} \to R^{Ne}$ be mapping from power to fuel consumption for the electrical generators. Similarly, define the mappings from power/heat generated by the CHP and pure heat generators to fuel consumption by $f_{CHP}: R^{Nc} \to R^{Nc}$ and $f_H: R^{Nt} \to R^{Nt}$ respectively. Thus, the cost of generating e units of power by the electrical generator $i_e$ at time t is given by the $(f_{CHP}(e,q))_{ie} \times C_f(t)$, where $(x)_i$ denotes the $i^{th}$ element of vector x. Similarly, the cost of generating e units of electrical power and q units of heat in the CHP unit $i_c$ is given by $(f_{CHP}(e, q))_{ic} \times C_f(t)$ and the cost of generating q units of heat in the pure heat generation unit it is given by $(f_H(q))_{it} \times C_f(t)$ Cost of importing and exporting from the grid. This is implemented as a function $C_g: R^N \to R^N$ such that the cost of importing e units of power at time t is given by $(Cg(e))_{t-t0+1}$, where $t_0$ is the initial time.

Load shedding costs. The cost of load shedding on load iel is assumed to be proportional to the amount of shortfall between the load demanded and supplied. That is, if $e_d(i_{el}, t)$ is; the load demand by $i_{el}$ at time t, then the load shedding cost is given by $$C_l(i_{el}, t) = \frac{|e_s(i_{el}, t) - e_d(i_{el}, t)| - (e_d(i_{el}, t) - e_s(i_{el}, t))}{2} \times C_{i_{el}}$$

where $e_s(i_{el}, t)$ is the supplied load and $c_{i_{el}}$ is the cost per unit shortfall between demand and supply. Note that loads are negative by convention.

Startup costs for each of the three different types of units (pure electric generation, CHP, and pure heat generation) depends on the unit and the time it has been off. Denote these by $S_E: R^{Ne} \to R^{Ne}$, $S_C: R^{Nc} \to R^{Ne}$ $S_H: R^{Nt} \to R^{Ne}$ respectively. The cost of starting up (the pure electrical generation) unit ie is $(S_E(T_O(i_e)))i_e = a_{ie} + b_{ie}(1 - \exp(-T_O(i_e)/c_{ie}))$, where $T_O(i_e)$ is the time for which unit $i_e$ has been off and $a_{ie}$, $b_{ie}$ and $c_{ie}$ are constants. The costs for starting up the CHP generators and the pure heat generators ($S_C$ and $S_H$ respectively) are similarly defined. Note that the startup cost is only applied at the first time step at which the generator is turned on.

Given the predicted values of $e(i, t)$, $q(i, t)$ and $u(i, t)$ for all the units in the grid, where $u(i,t)$ is a quantity that determines whether unit 'i' is on or off (i.e. 0=off and 1=on), the model does the following:
1) Predicts the first order dynamics of the various storages ($p(i_{es}, t)$ and $h(i_{ts}, t)$);
2) Runs a full AC power flow at each time step of the prediction horizon computing the exact grid import/export $e_g(t)$ (line losses are considered).
3) Computes all node voltages; and
4) Computes total cost as a function of time.

The model is a very general program to compute the objective function associated with a particular dispatch profile. This could be used, via first order gradient-descent or other similar approaches, to compute a solution to the problem of finding the optimal solution (i.e., the solution that minimizes the cost over the prediction horizon). However, from the point of view of computational tractability and guaranteed polynomial-time convergence, the present inventors have identified certain physically meaningful assumptions, which will enable the optimization problem to be formulated as a convex problem. These assumptions, formulation and the proposed solution is described herein below.

A background in convex optimization theory sufficient for the following discussion is easily found in prior art references. Assume that $u(i, t)$ are given over the prediction horizon $\{t \in Z: t_0 \leq t \leq t_0 + N\}$. The optimal dispatch problem is formulated as a convex optimization problem in dual form:

$$\max b'y \quad (1)$$

$$s \cdot t \quad (2)$$

$$A'y \leq Kc, \quad (3)$$

where K is a direct product of polyhedral and second-order cones:

$$K := R_{Np}^+ \times S_{Ns,1}^+ \times \ldots S_{Ns,m}^+$$

Here, $R_M^+$ denotes the nonnegative orthant:

$$R_M^+ = \{x \in R_M : x \geq 0\}$$

and S+M denotes the second-order cone $$S_M^+ := \{(x_1, \ldots x_M) : x_M \geq \sqrt{x_1^2 + \ldots + x_{M-1}^2}\}$$

The vector y of decision variables is as follows:

$$y := [Ye; Yc; Yt; Yel; Ytl; Yes; Yts; Yaux],$$

where
Ye is the dispatchable generation from the pure electric generators;
Yc is the dispatchable generation from the CHP generators;
Yt is the dispatchable generation from the pure heat generators;
Yel is the power supplied to the dispatchable electric loads;
Ytl is the power supplied to the dispatchable thermal loads;
Yes is the vector of energy stored in the batteries;
Yts is the temperature of the thermal storage units (for example, the buildings); and
Yaux is a set of auxiliary variables used to make the problem convex. Note that each of these variables is defined at every time step. For example, if there are Ne pure electric units, all of which are dispatchable, and the method is using a prediction horizon of N steps, then Ye is of dimension Ne×N.

The following approximations are made to the problem to allow it to be formulated as described herein below:

Fuel curves are approximated by affine or convex quadratic functions. In some cases, the fuel consumption is in fact an affine function of power generated. This is also true in all cases where the efficiency is constant over the operating range of the unit;

The cost of import form the grid is always greater than or equal to price of export. This is true in practice;

For CHPs, the relation between heat and power is assumed to be linear. This is true, for example, for Jenbacher CHPs. But a non-linear relationship can be adopted with minimum changes to the algorithm; and Startup costs are neglected. This restriction is not very difficult to remove and can be taken into ac count outside the convex optimization routine.

The total predicted cost for the system, neglecting the startup costs of the units, is given by $$\sum_{t=t_0}^{N+t_0} \left( \sum_i C_f(i, t) \right) + \left( \sum_{i_{el}} C_l(i_{el}, t) \right) + C_g(t) \quad (4)$$

This cost is minimized subject to various (linear) constraints such as upper and lower bounds on power generation from various machines, ramp rate constraints. Here, $C_f(i, t)$ represents the fuel consumed by unit i at time t, $C_l(i_{el}, t)$ represents load shedding cost at load $i_{el}$ at time t, and $C_g(t)$ represents the cost of importing from the grid (or the price of exporting to the grid).

Once the assumptions described herein above are in place, the overall problem can be formulated as a convex optimization problem by converting each of the constraints and objective functions into convex constraints. An example is used to describe the process.

Example: Suppose that $e_1(t), e_2(t), \ldots, e_n(t)$ are the electric power outputs from the dispatchable generators, and that $\epsilon_1(t), \epsilon_2(t), \ldots, \epsilon_n(t)$ are the electric power outputs from the non-dispatchable generators. Note that $\epsilon_i(t)$ are known (assumed predicted ahead of time). Also, assume that there are dispatchable loads with predicted demand $l_1(t), \ldots, l_p(t)$ (known) and non-dispatchable loads $l_1(t), \ldots, l_q(t)$ (also known). According to the model, loads are negative, generations are positive, and one can choose to supply less power than the demand for dispatchable loads. Thus, let the supply for the dispatchable loads be $s_1(t), \ldots, s_p(t)$. Let the total cost of buying one anit of electricity be 'a' and that the cost of selling one unit of electricity be 'b'. Now, the total power generation is given by $$E(t) := \sum_{i=1}^{n} e_i(t) + \sum_{i=1}^{m} \epsilon_i(t) + \sum_{i=1}^{p} s_i(t) + \sum_{i=1}^{q} l_i(t)$$

If the generation is positive, the excess can be sold to the grid, while if it is negative, the deficit must be bought from the grid. Thus, the cost of buying/selling from the grid is $$C_g(t) = \begin{cases} -aE(t) & \text{if } E(t) < 0 \\ bE(t) & \text{otherwise} \end{cases}$$

It can be shown that the above can be rewritten as $$C_g(t) = -\frac{a+b}{2}E(t) + \frac{a-b}{2}|E(t)|$$

Using the crucial fact that $a \geqq b$ (buying cost is greater than selling price), the problem of minimizing this cost can be stated as $$\min\left(-\frac{a+b}{2}E(t) + \frac{a-b}{2}\sigma(t)\right)$$

subject to $$-E(t) \leq \sigma(t), E(t) \leq \sigma(t),$$

where $\sigma(t)$ is an auxiliary variable. Notice that the resulting problem in linear in the decision variables, $\sigma(t)$ and $E(t)$. Thus, this objective function minimization problem has been transformed into a convex (in fact, linear) problem. Similar but rather more complicated arguments can be used to convert the full optimal dispatch problem (i.e., the problem of minimizing the total predicted cost for the system represented by equation (4) into a convex optimization problem in the general form represented by equations (1), (2) and (3).

In order to solve an optimal dispatch problem for an arbitrary microgrid using the optimization techniques described herein above, a user needs to specify only a few high-level details of the assets in the problem. The functions of building the large-scale model of the grid, the prediction and the optimization can then be done automatically.

Figure 2:
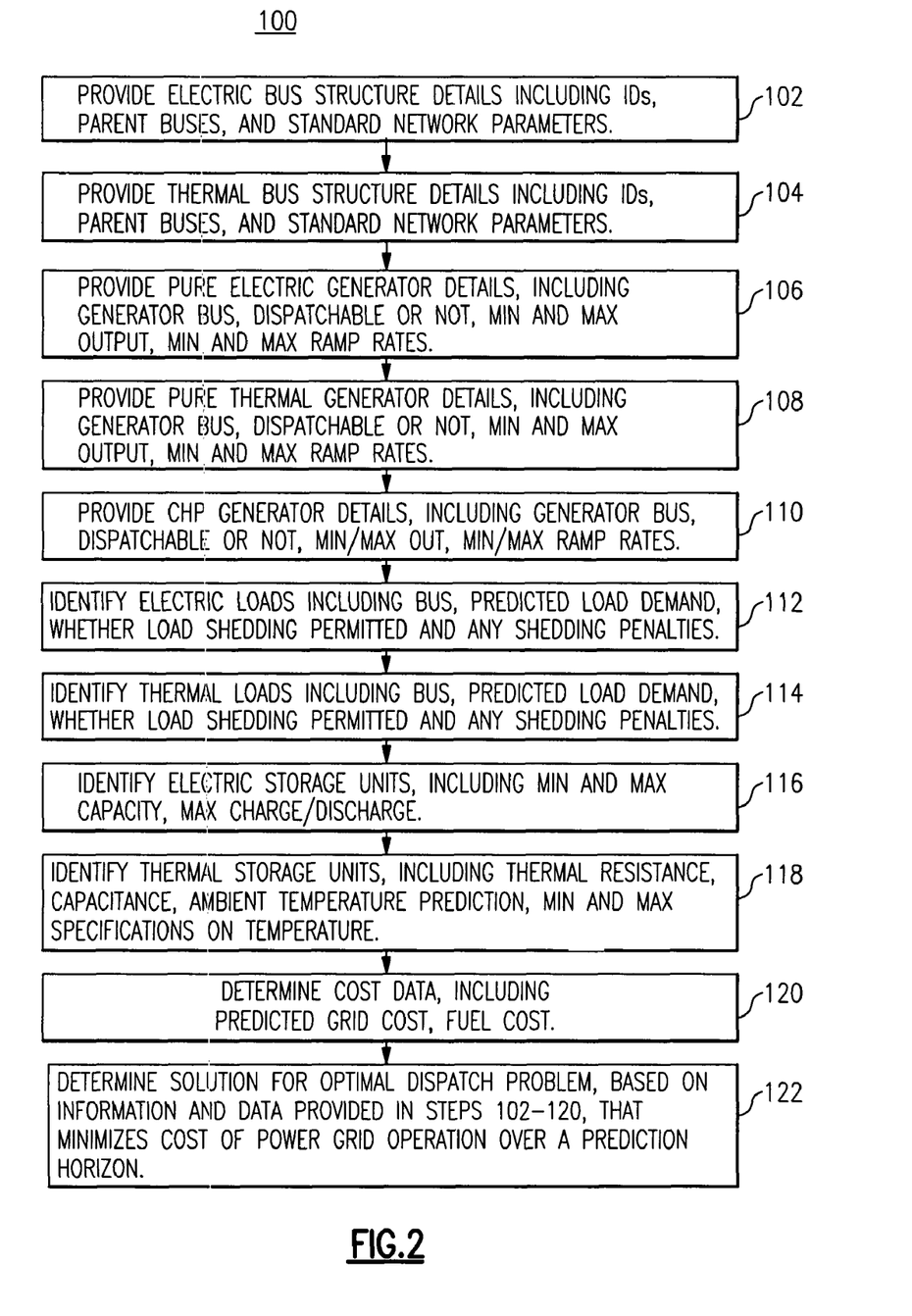
FIG. 2 is a flowchart illustrating exemplary steps of a method for controlling a microgrid, according to one embodiment.

FIG. 2 illustrates a method of power system dispatch 100 according to one embodiment in which the user specifies the following details:

1. Electric bus structure (Bus IDs, parent bus for each bus (except for the infinite bus)), standard network parameters, as represented in block 102;

2. Thermal bus structure (similar to the above), as represented in block 104;

3. Details of pure electric generators (which bus is each generator connected to, are they dispatchable or not, minimum and maximum output, minimum and maximum ramp rates), as represented in block 106;

4. Details of pure thermal generators (as above), as represented in block 108;

5. Details of CHP generators (as above; in addition, the relation between heat and power generation), as represented in block 110;

6. Electric loads (bus connected to, demanded load prediction, whether load shedding is permitted or not, load shedding penalties), as represented in block 112;

7. Thermal Loads (as above), as represented in block 114;

8. Electric storage units (min and max capacity, max charge/discharge rate), as represented in block 116;

9. Thermal storage units (thermal resistance, capacitance, ambient temperature prediction, min and max specifications on temperature), as represented in block 118; and 10. Cost data (predicted grid cost, fuel cost), as represented in block 120. The details can be specified through a fairly intuitive interface (such as, for example, a Matlab m-file) so that a user can specify everything required to solve the optimal dispatch problem for a new microgrid in the order of a few hours. The code then generates the large-scale optimization problem and calls an open-source solver to solve the optimal dispatch problem, as represented in block 122. The solution provides all dispatchable generations, loads, and grid generation as a function of time:

Although electrical and thermal energy dispatch devices and methods have been described herein above, the present invention is not so limited, and can include many other types of dispatch assets including without limitation water dispatch assets such as water pumps 52 and water storage elements 54 interconnected via a water path 56 such as also depicted in FIG. 1. These water dispatch assets may form portions of a water treatment facility 166 such as depicted in FIG. 3, that can each be commanded to meet water demands in the system using the same principles discussed herein above with reference to electrical and thermal energy dispatch.

Figure 3:
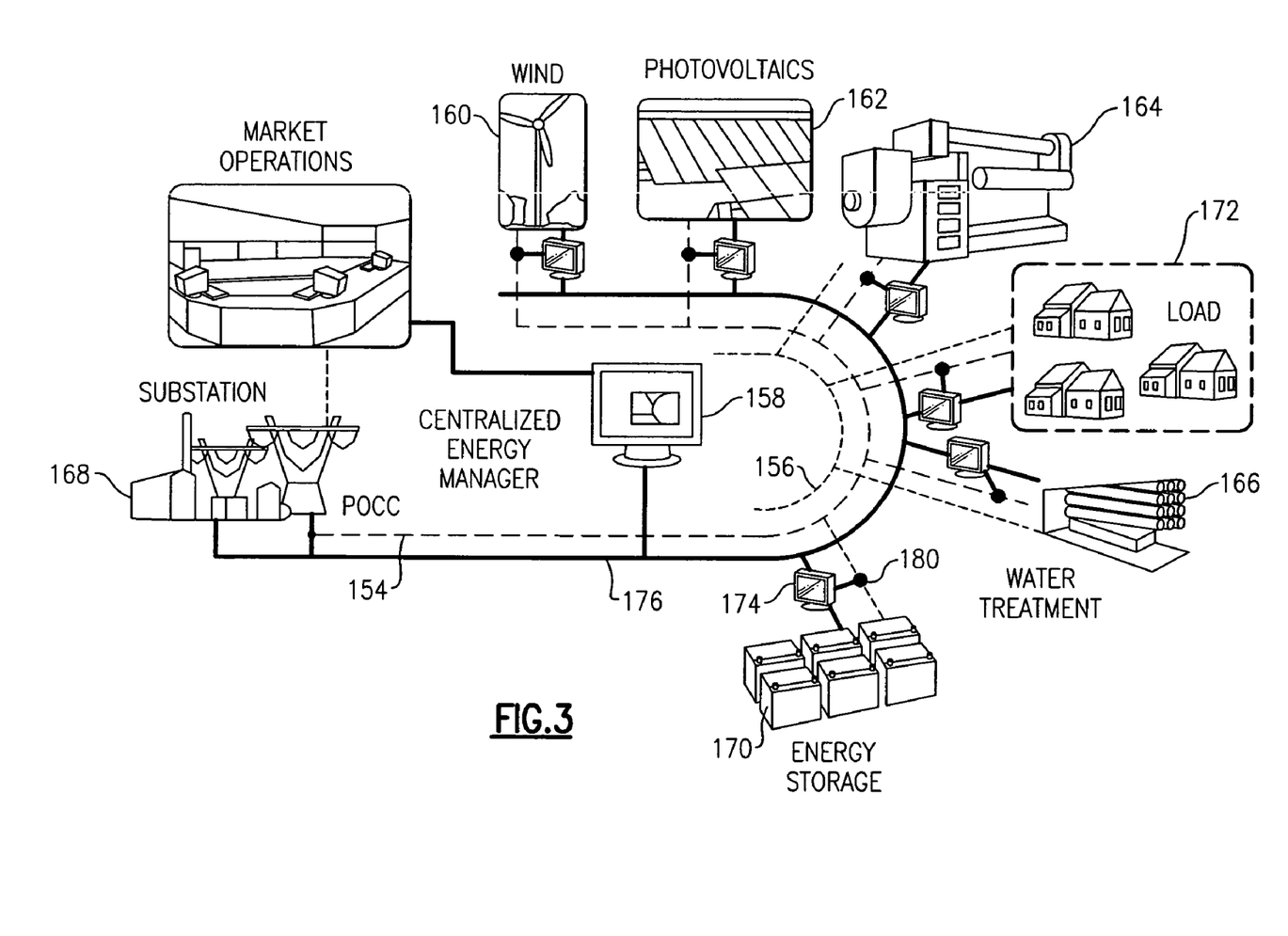
FIG. 3 is a pictorial diagram illustrating a plurality of microgrid assets interconnected on electric and thermal grids, according to one embodiment.

With continued reference to FIG. 3, a pictorial diagram illustrates a plurality of microgrid assets interconnected on electric and thermal grids 154, 156, according to one embodiment. The microgrid assets are controlled via a centralized energy manager 158 over a communication and control network 176 and is responsive to market conditions among other things such as discussed herein before to dispatch assets including wind power 160, solar power 162, conventional electrical power and/or heat 164, water 166, substation power 168, energy storage 170 and loads 172. The water assets 166 may include, for example, water pumps and water storage facilities, as stated above. Local control agents 174 also operate over the communication and control network 176 to assist controlling the dispatch of corresponding assets. Local protection elements 180 operate in combination with the local control agents 174 to protect the various dispatchable assets under adverse operating conditions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for controlling a microgrid, the system comprising:
   a plurality of microgrid assets comprising electric generators, heat generators, electric loads, heat loads, thermal storage components, water pumps and water storage components; and
   a dispatch controller coupled to the plurality of microgrid assets and configured for providing control signals to adjust operation of respective microgrid assets in response to a predictive optimization control algorithm, such that heat and power generated together or independently by the plurality of microgrid assets interconnected on electric and/or thermal grids of any specified topology, and further such that water dispatch, are together scheduled to optimize the solution of an objective function associated with microgrid operation over a predetermined time horizon based on predicted future microgrid asset conditions, electric generator up-time and down-time constraints, thermal generator up-time and down-time constraints, and combined heat and power generator up-time and down-time constraints, wherein the dispatch controller is further configured to be responsive to the prediction optimization control algorithm based on load shedding costs that are proportional to the amount of shortfall between the demanded and supplied load.

2. The system of claim 1 wherein the microgrid assets further comprise one or more of thermal components, stochastic renewable energy sources, and network components.

3. The system of claim 1 wherein the predictive optimization control algorithm is selected from Merit Order Loading, Range Elimination, Binary Section, Secant Section, Graphical/Table Look-Up, Convex Simplex, Dantzig-Wolf Decomposition, Separable Convex Linear Programming, Reduced Gradient with Linear Constraints, Steepest Descent Gradient, First Order Gradient, Merit Order Reduced Gradient, Second Order Cone Programming, and Nonlinear Programming algorithms.

4. The system of claim 1, wherein the dispatch controller is responsive to the predictive optimization control algorithm such that the heat and power generated together or independently, are based on future predicted values of loads, renewable energy sources, and fuel and electricity prices.

5. The system of claim 1, wherein the predictive optimization control algorithm is configured to control the dispatch controller based on future predicted values of microgrid constrained variables.

6. The system of claim 1, wherein the dispatch controller is configured to be responsive to the predictive optimization control algorithm based on predicted fuel costs over a desired prediction horizon.

7. The system of claim 1, wherein the dispatch controller is configured to be responsive to the predictive optimization control algorithm based on fuel consumption curves associated with at least one generator type selected from pure electrical generators, pure heat generators, and combined electrical and heat generators.

8. The system of claim 1, wherein the dispatch controller is configured to be responsive to the prediction optimization control algorithm based on costs of importing and exporting power from the microgrid.

9. The system of claim 1, wherein the dispatch controller is configured to be responsive to the prediction optimization control algorithm based on start-up costs associated with at least one generator type selected from pure electrical generators, pure heat generators, and combined electrical and heat generators.

10. The system of claim 1, wherein the objective function comprises the total predicted cost of microgrid operation over the predetermined time horizon based on the predicted future microgrid asset conditions.

11. A method of controlling a microgrid, the method comprising:
    monitoring a plurality of microgrid assets comprising heat generators, electric generators, heat loads, electric loads, thermal storage components, water pumps, and water storage components; and
    dispatching respective microgrid assets in response to a predictive optimization control algorithm, such that heat and power generated together or independently by the plurality of microgrid assets interconnected on electric and/or thermal grids of any specified topology, and further such that water dispatch, are together scheduled to optimize the solution of an objective function associated with microgrid operation over a predetermined time horizon based on predicted future microgrid asset conditions, electric generator up-time and down-time constraints, thermal generator up-time and down-time constraints, and combined heat and power generator up-time and down-time constraints, and further such that dispatching respective microgrid assets is based upon load shedding costs that are proportional to the amount of shortfall between the demanded and supplied load.

12. The method of claim 11, wherein monitoring a plurality of microgrid assets further comprises monitoring one or more microgrid assets selected from thermal components, stochastic energy sources such as wind and solar PV, and network components.

13. The method of claim 11, wherein dispatching respective microgrid assets in response to a predictive optimization control algorithm comprises dispatching respective microgrid assets in response to a predictive optimization control process based on any one or more of Merit Order Loading, Range Elimination, Binary Section, Secant Section, Graphical/Table Look-Up, Convex Simplex, Dantzig-Wolf Decomposition, Separable Convex Linear Programming, Reduced Gradient with Linear Constraints, Steepest Descent Gradient, First Order Gradient, and Merit Order Reduced Gradient algorithms.

14. The method of claim 11, wherein dispatching respective microgrid assets in response to a predictive optimization control algorithm comprises dispatching heat and power generated together or independently, based on future predicted values of loads, stochastic energy sources, and fuel and electricity prices.

15. The method of claim 11, wherein dispatching respective microgrid assets in response to a predictive optimization control algorithm comprises dispatching respective microgrid assets based on future predicted values of microgrid constrained variables.

16. The method of claim 11, wherein dispatching respective microgrid assets in response to a predictive optimization control algorithm comprises dispatching respective microgrid assets based on predicted fuel costs over a desired prediction horizon.

17. The method of claim 11, wherein dispatching respective microgrid assets in response to a predictive optimization control algorithm comprises dispatching respective microgrid assets based on fuel consumption curves associated with at least one generator type selected from pure electrical generators, pure heat generators, and combined electrical and heat generators.

18. The method of claim 11, wherein dispatching respective microgrid assets in response to a predictive optimization control algorithm comprises dispatching respective microgrid assets based on costs of importing and exporting power from the microgrid.

19. The method of claim 11, wherein dispatching respective microgrid assets in response to a predictive optimization control algorithm comprises dispatching respective microgrid assets based on start-up costs associated with at least one generator type selected from pure electrical generators, pure heat generators, and combined electrical and heat generators.

20. The method of claim 11, wherein the objective function comprises the total predicted cost of microgrid operation over the predetermined time horizon based on the predicted future microgrid asset conditions.

* * * * *

UNITED STATES PATENT AND TRADEMARK OFFICE
CERTIFICATE OF CORRECTION

PATENT NO.         : 7,991,512 B2                                    Page 1 of 1
APPLICATION NO.    : 11/897207
DATED              : August 2, 2011
INVENTOR(S)        : Chandra et al.

It is certified that error appears in the above-identified patent and that said Letters Patent is hereby corrected as shown below:

In Column 1, Line 20, delete "asserts" and insert -- assets --, therefor.

In Column 3, Line 47, delete "supple" and insert -- supply --, therefor.

In Column 3, Line 58, delete " $i_e \in N_e := \{1, \ldots, N_e\})$ " and insert -- $i_e \in N_e := \{1, \ldots, N_e\}$ --, therefor.

In Column 4, Line 3, delete " $i_c \in N_c \{:= 1, \ldots, N_c\}$ " and insert -- $i_c \in N_c := \{1, \ldots, N_c\}$ --, therefor.

In Column 4, Line 25, delete " $i_{el} \in N_{el} :$ " and insert -- $i_{el} \in N_{el} :=$ --, therefor.

In Column 5, Line 1, delete " $(f_{CHF}(e,q))_{ie} \times C_f(t)$ " and insert -- $(f_E(e))_{ie} \times C_f(t)$ --, therefor.

In Column 5, Line 27, delete " $S_C : R^{N_c} \to R^{N_e}$ " and insert -- $S_C : R^{N_c} \to R^{N_e}$ and --, therefor.

In Column 7, Line 12, delete "anit" and insert -- unit --, therefor.

In Column 8, Line 31, delete "time:" and insert -- time. --, therefor.

Signed and Sealed this
Eleventh Day of September, 2012

David J. Kappos
*Director of the United States Patent and Trademark Office*